(12) United States Patent
DiLorenzo et al.

(10) Patent No.: US 10,559,109 B2
(45) Date of Patent: *Feb. 11, 2020

(54) MULTIPOINT OFFSET SAMPLING DEFORMATION

(71) Applicant: DreamWorks Animation L.L.C., Glendale, CA (US)

(72) Inventors: Paul Carmen DiLorenzo, Glendale, CA (US); Matthew Christopher Gong, North Hollywood, CA (US); Arthur D. Gregory, Sherman Oaks, CA (US)

(73) Assignee: DreamWorks Animation L.L.C., Universale City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/723,063

(22) Filed: Oct. 2, 2017

(65) Prior Publication Data
US 2018/0025527 A1 Jan. 25, 2018

Related U.S. Application Data

(63) Continuation of application No. 13/269,477, filed on Oct. 7, 2011, now Pat. No. 9,786,083.

(51) Int. Cl.
*G06T 13/40* (2011.01)
*G06T 15/00* (2011.01)
(Continued)

(52) U.S. Cl.
CPC .............. *G06T 13/40* (2013.01); *G06T 13/80* (2013.01); *G06T 15/005* (2013.01); *G06T 11/001* (2013.01); *G06T 19/00* (2013.01)

(58) Field of Classification Search
None
See application file for complete search history.

(56) References Cited

U.S. PATENT DOCUMENTS 4,441,201 A * 4/1984 Henderson ............ G09B 19/06
704/265
5,325,477 A 6/1994 Klassen
(Continued)

FOREIGN PATENT DOCUMENTS

WO 2004/104936 A1 12/2004

OTHER PUBLICATIONS

Wilhelms "Modeling Animals with Bones, Muscles, and Skin", USCS-CRL-95-01, Jan. 24, 1994.*
(Continued)

*Primary Examiner* — Saptarshi Mazumder
(74) *Attorney, Agent, or Firm* — Dentons US LLP

(57) ABSTRACT

A skin deformation system for use in computer animation is disclosed. The skin deformation system accesses the skeleton structure of a computer generated character, and accesses a user's identification of features of the skeleton structure that may affect a skin deformation. The system also accesses the user's identification of a weighting strategy. Using the identified weighting strategy and identified features of the skeleton structure, the skin deformation system determines the degree to which each feature identified by the user may influence the deformation of a skin of the computer generated character. The skin deformation system may incorporate secondary operations including bulge, slide, scale and twist into the deformation of a skin. Information relating to a deformed skin may be stored by the skin deformation system so that the information may be used to produce a visual image for a viewer.

18 Claims, 15 Drawing Sheets

(51) Int. Cl.
*G06T 13/80* (2011.01)
*G06T 19/00* (2011.01)
*G06T 11/00* (2006.01)

(56) References Cited

U.S. PATENT DOCUMENTS

| | | |
|---|---|---|
| 6,037,949 A | 3/2000 | Derose et al. |
| 6,400,368 B1 | 6/2002 | Laperriére et al. |
| 6,600,485 B1 * | 7/2003 | Yoshida ............. G06T 17/30 345/419 |
| 6,992,665 B2 | 1/2006 | Toyama et al. |
| 7,333,111 B2 | 2/2008 | Ng-Thow-Hing et al. |
| 7,515,155 B2 | 4/2009 | Anderson et al. |
| 7,859,538 B2 | 12/2010 | Isner et al. |
| 8,237,775 B2 | 8/2012 | Givon et al. |
| 8,358,310 B2 | 1/2013 | Miller et al. |
| 8,531,464 B1 | 9/2013 | Cohen et al. |
| 2005/0062737 A1 | 3/2005 | Wang |
| 2006/0284099 A1 * | 12/2006 | Ruehrnschopf ........ G01T 1/24 250/363.04 |
| 2007/0268293 A1 | 11/2007 | Miller et al. |
| 2009/0179899 A1 * | 7/2009 | Gregory ............... G06T 13/40 345/473 |
| 2010/0134490 A1 | 6/2010 | Corazza et al. |

OTHER PUBLICATIONS

Decision to Refuse received for European Patent Application No. 12187147.9, dated Feb. 27, 2019, 12 pages.
Minutes of the Oral Proceedings received for European Patent Application No. 12187147.9, mailed Feb. 27, 2019, 3 pages.

* cited by examiner

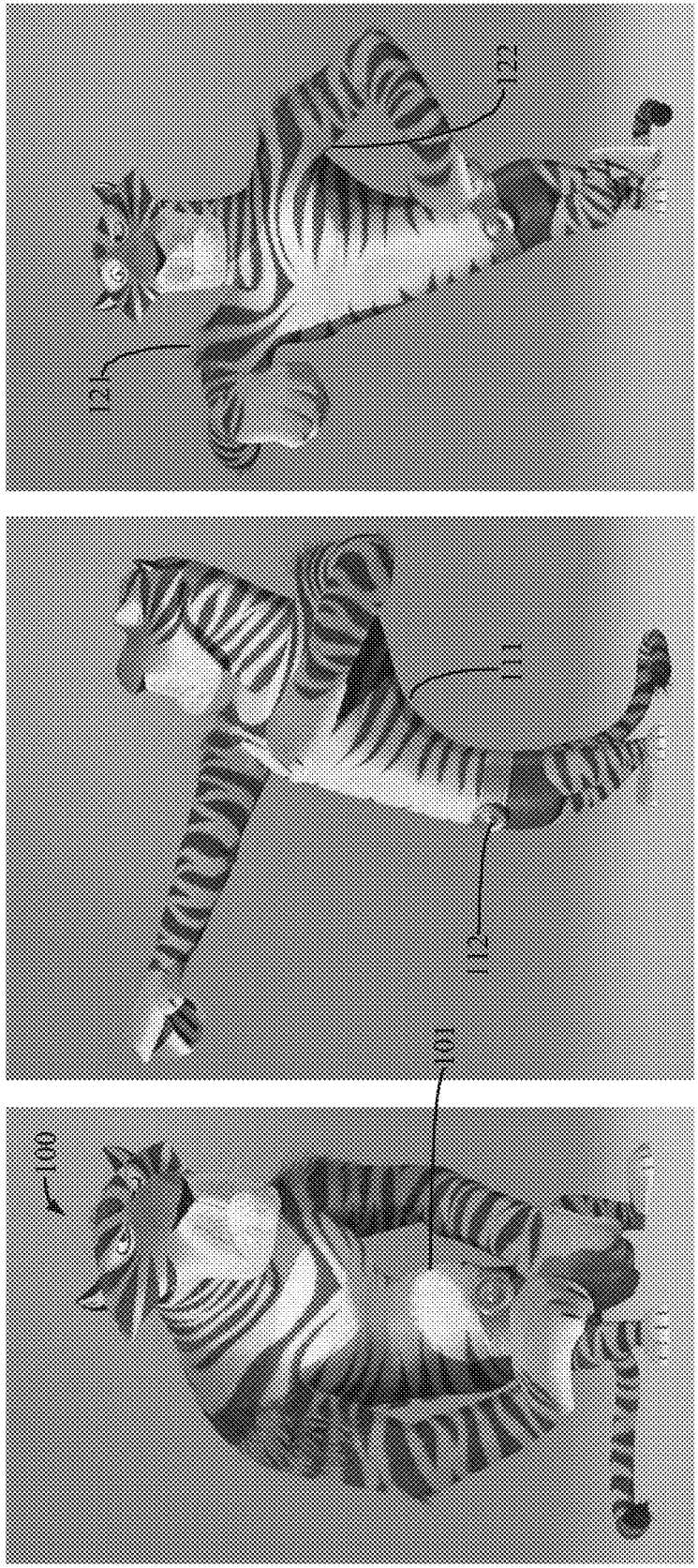

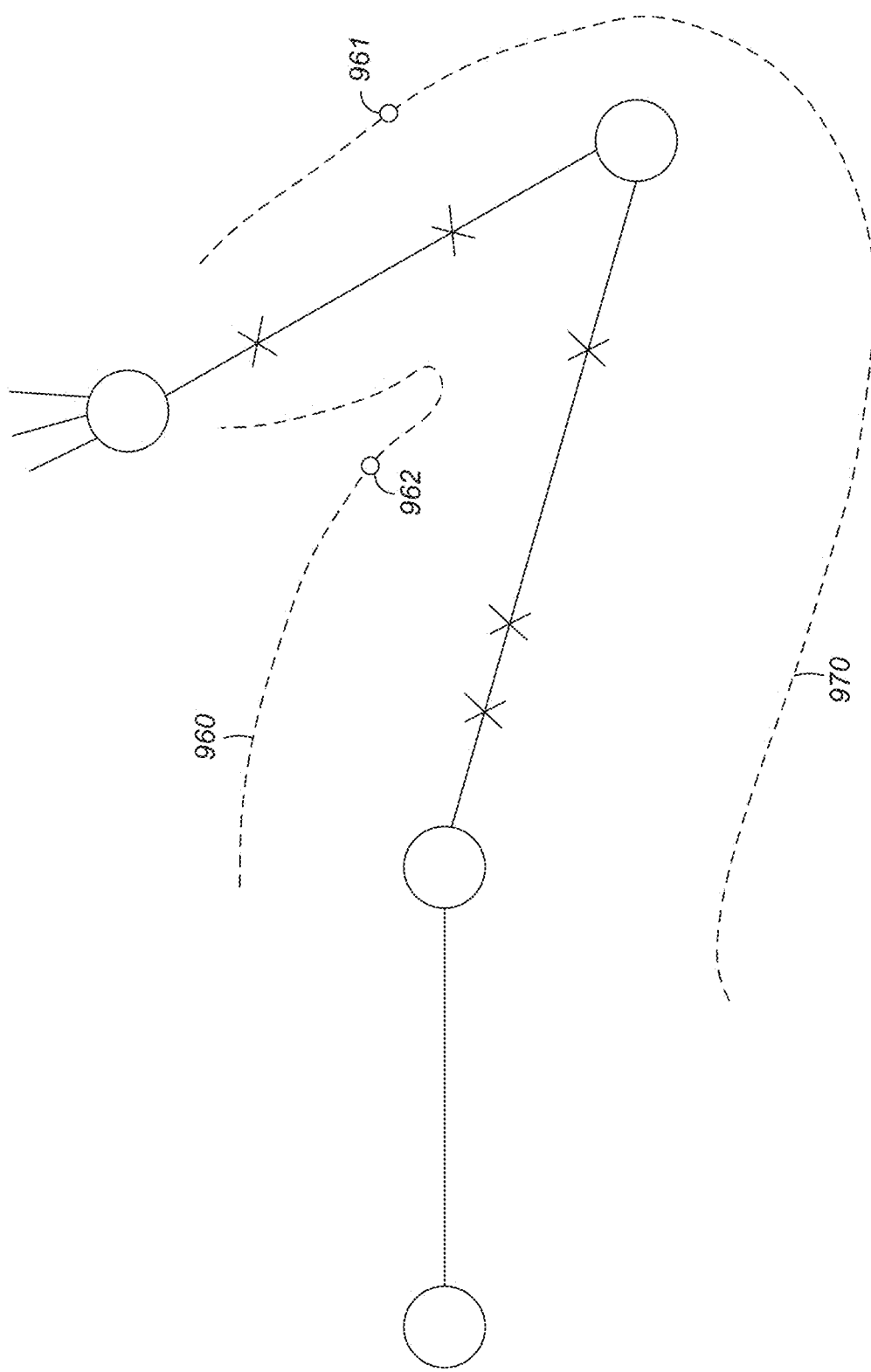

MULTIPOINT OFFSET SAMPLING DEFORMATION

CROSS-REFERENCE TO RELATED APPLICATIONS

This application is a continuation of U.S. patent application Ser. No. 13/269,477, titled "MULTIPOINT OFFSET SAMPLING DEFORMATION," filed on Oct. 7, 2011, now U.S. Pat. No. 9,786,083, issued on Oct. 10, 2017, the subject matter of which is hereby incorporated by reference in its entirety for all purposes.

BACKGROUND

A portion of the disclosure of this patent document contains material which is subject to copyright protection, such as illustrations of computer generated characters. The copyright owner has no objection to the facsimile reproduction by anyone of the patent document or the patent disclosure, as it appears in the Patent and Trademark Office patent file or records, but otherwise reserves all copyright rights whatsoever.

1. Field

This application relates generally to computer graphics, and more specifically to the deformation of skin on a computer generated character in computer animation.

2. Related Art

In the field of computer animation, a computer generated character is typically modeled using a skeleton structure that is covered with a skin layer. An artist may achieve the visual effect of animation through movements of the bones and joints in the skeleton structure. The skin layer covering the skeleton structure moves, or deforms, in response to movements of the skeleton structure and imparts a visually plausible appearance to the computer generated character. The use of a skeleton structure and skin deformation to animate a computer generated character is more computationally efficient than the use of, for example, multiple individual drawings to produce animation.

Since the skin layer of a computer generated character is outwardly visible to viewers of the computer animation, an efficient deformation technique that produces convincing skin deformations is desirable. For example, if an artist chooses to bend the elbow of a computer generated character, it would be desirable to deform the skin layer with a life-like bulge at the bicep with minimal input from the artist and by using minimal computing resources.

Conventional deformation techniques are by artists to produce skin deformations. A conventional deformation technique may, however, require significant input from an artist before it becomes configured to produce skin deformations. For example, a conventional deformation technique known as skeleton subspace deformation (SSD) requires an artist to identify and to assign numerical weights to portions of a skeleton structure prior to skin deformation. The process of assigning multiple numerical weights to skeletal portions (e.g., skin vertices), called "weight painting," is time-consuming, especially for skin areas of a computer animated character that exhibit frequent and/or complex movements.

In addition, an artist may perform weight-painting for a conventional deformation technique only to find that the conventional deformation technique produces a visually unconvincing skin deformation. For example, a conventional deformation technique, including SSD, may produce a skin deformation that shows crunching or shrinkage of skin around a bent elbow, as illustrated in FIGS. 2A and 2B, respectively. Notably, an artist may have to re-perform the weight painting process in order to improve upon the visually unconvincing deformation. Further, the artist may resort to deforming multiple skin layers between a skeleton structure and a final skin to improve upon the deformation. Further yet, the artist may perform the deformation process anew using another conventional deformation technique. These options are time-consuming and/or computationally expensive.

A conventional deformation technique may also fail to provide artist controls for enhancing the realism of a skin deformation. For example, a conventional deformation technique may fail to produce sufficient bulging of the bicep in response to a bent elbow. In order to introduce bulging into a skin layer, an artist using a conventional deformation technique may introduce volume constraints (e.g., limits) that disallow the deformation of skin into a defined volume during the deformation process. However, the introduction of volume constraints is time-consuming for the artist and/or computationally expensive.

SUMMARY

In one embodiment, the skin of a model of a computer animation character is deformed by accessing the model, which includes a skeleton having a plurality of bones connected at one or more joints. A joint of the one or more joints is associated with a first local coordinate system. A user's selection of one or more control points is also accessed. Each control point is associated with a second local coordinate system. A skin vertex is also accessed. The skin vertex represents a location on the skin and the skin vertex is associated with a position vector. A user's selection of a weighting strategy is also accessed, and a new position vector of the skin vertex is determined using the selected weighting strategy and the selected control points. The new position vector of the skin vertex may be stored into memory.

In one embodiment, the new position vector of the skin vertex is determined by identifying a subset of the control points using the skin vertex and the selected weighting strategy, and determining a numerical coefficient for each control point in the identified subset of control points, using the position vector of the skin vertex, a position vector of each control point in the identified subset of control points, and the selected weighting strategy. An offset vector is determined using the local coordinate system associated with each control point in the identified subset of control points and the weighting coefficients.

In some embodiments, a position vector of a control point of the one or more control points is to change prior to the determining of a new position vector of the skin vertex. In some embodiments, the local coordinate system of a control point of the one or more control points is to change prior to the determining of a new position vector of the skin vertex. In some embodiments, a difference between the position vector of the skin vertex and the new position vector of the skin vertex is calculated, a user's selection of a scaling factor is received, and another position vector for the skin vertex is determined based on the received scaling factor, the calculated difference, and at least one of the position vector of the skin vertex and the new position vector of the skin vertex.

DESCRIPTION OF THE FIGURES

FIGS. 1A-C are screen views depicting an exemplary animation character produced using an embodiment of the Multipoint Offset Sampling (MOS) deformation system.

FIG. 9 is a close-up view depicting a portion of a computer generated character in a final pose.

DETAILED DESCRIPTION

Figure 2A:
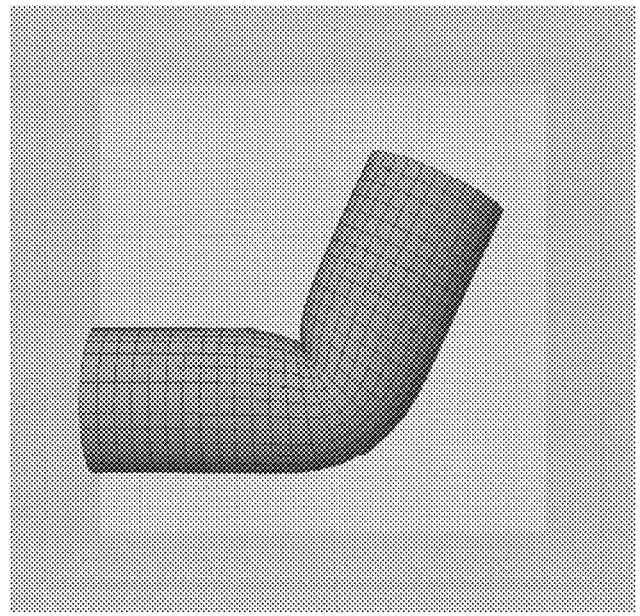
FIGS. 2A-B are screen views depicting skin deformations produced using related art.
Figure 2B:
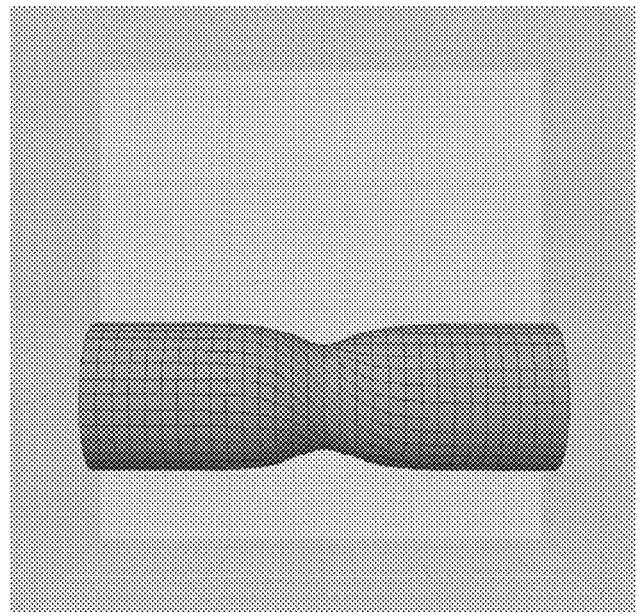

The following description sets forth exemplary methods, parameters and the like. It should be recognized, however, that such description is not intended as a limitation on the scope of the present disclosure but is instead provided as a description of exemplary embodiments.

2. Overview

FIGS. 1A-1C depict an exemplary computer generated character, tiger 100, in three poses. The skin layer of tiger 100 may be produced using an embodiment of the Multi-Point Offset Sampling (MOS) deformation system described herein. For example, the bulging skin at abdomen area 101 and bicep area 122 of tiger 100 may be produced using an embodiment of the MOS deformation system. In addition, curved back area 111 and shoulder area 121 may also be produced using an embodiment of the MOS deformation system.

For the sake of clarity and convenience, exemplary embodiments of the MOS deformation system may be described with reference to animating a computer generated character similar to tiger 100. It should be recognized, however, that the MOS deformation system may apply to different computer generated characters. For example, a computer generated character produced using the MOS deformation system may represent an object that is animate or inanimate, real or imaginary. Likewise, the skeleton structure used in the MOS deformation system may be anatomically correct or anatomically incorrect. As used here, "skin" may refer to a number of coverings used with a computer generated character. For example, a "skin" may refer to the furry skin of a tiger. The "skin" may also include clothing worn by the tiger. The embodiments and examples described herein are thus not intended to limit the applications of the MOS deformation system.

Figure 3A:
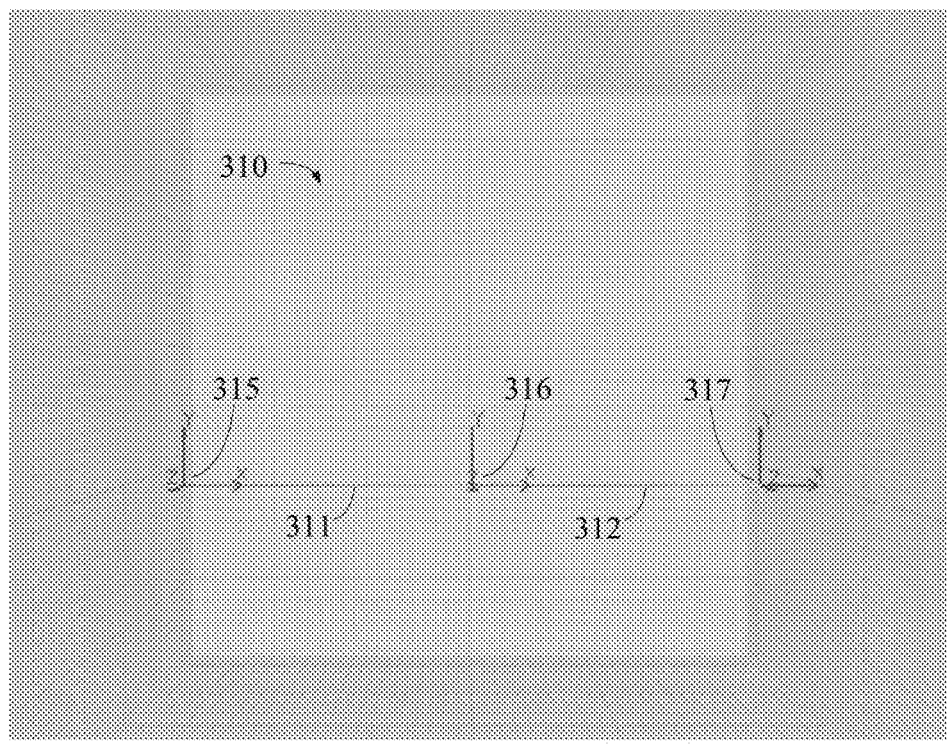
FIGS. 3A-C and 3E-F are screen views depicting skin deformations produced using an embodiment of the MOS deformation system.
Figure 3B:
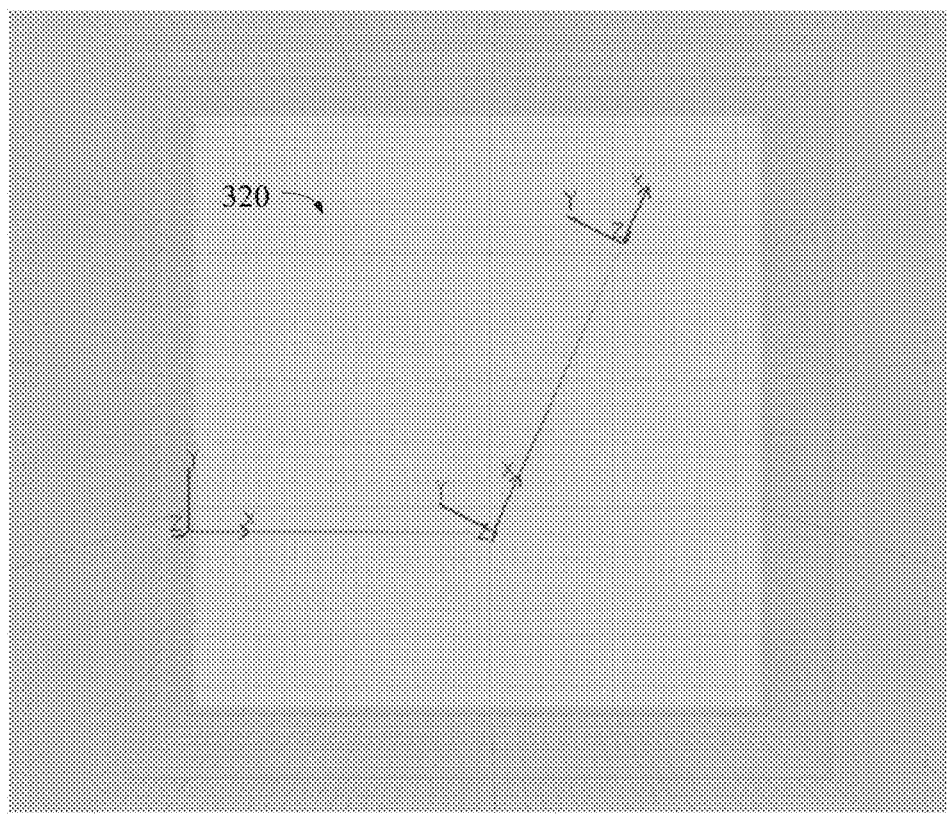

FIGS. 3A-3F provide a comparison of an exemplary skin layer produced using a conventional deformation technique known as skeletal subspace deformation (SSD) and skin layers produced using an embodiment of the MOS deformation system. FIG. 3A depicts skeleton structure 310 consisting of bones 311-312 and joints 315-317 in an initial pose. FIG. 3B depicts skeleton structure 320, which corresponds to skeleton structure 310 (FIG. 3A), in a final pose. The movement of skeleton structure 310 (initial pose) into skeleton structure 320 (final pose) may be configured by an artist.

Figure 3C:
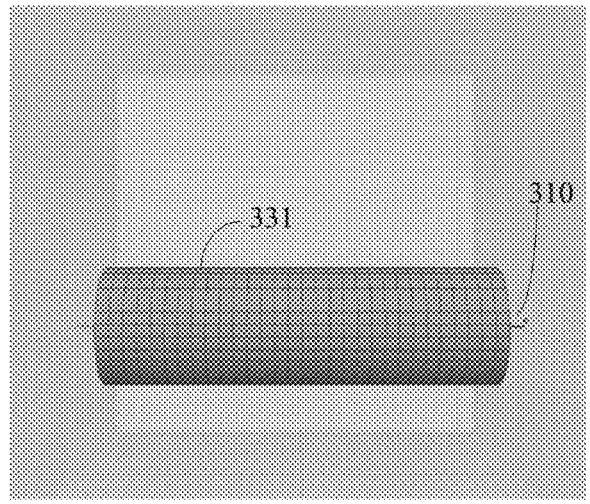
Figure 3D:
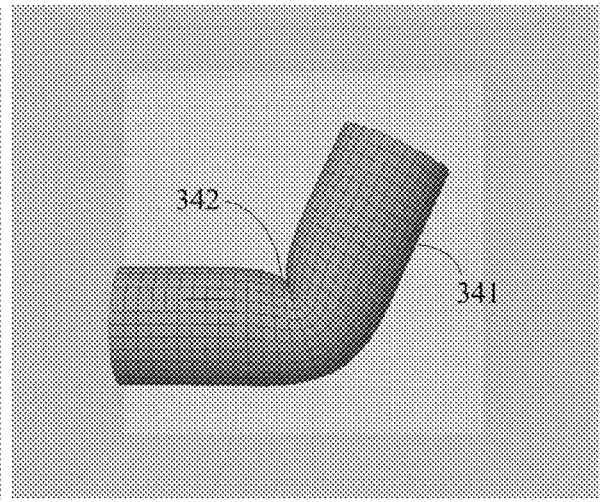
FIG. 3D is a screen view depicting skin deformations produced using related art.
Figure 3E:
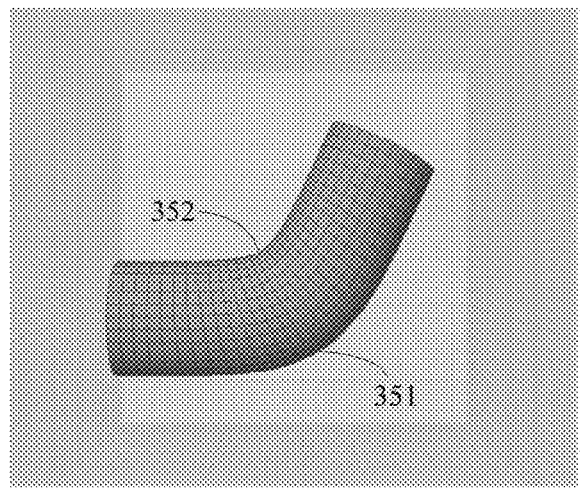

FIG. 3C depicts skin layer 331 covering skeleton structure 310. For sake of simplicity, skin layer 331 may have a cylindrical shape, and may be produced using a conventional deformation processes (e.g., SSD). FIG. 3D illustrates skin layer 341 which may be produced using a conventional deformation technique (e.g., SSD) based on the movement of skeleton structure 310 into skeleton structure 320. Notably, skin layer 341 includes a reduction in volume near skin area 342. FIG. 3E depicts skin layer 351 which may be produced using the MOS deformation system. In contrast to the deformation shown in FIG. 3D, skin 351 does not include any perceptible reduction in volume near skin area 352.

The reduction in volume near skin area 342 (FIG. 3D) may cause skin layer 341 to appear visually unconvincing to a viewer. For example, if skin layer 341 represents the tail of an animated tiger, reduction in volume near skin area 342 may cause the tiger's tail to appear pinched or crooked and thus lacking in realism. In contrast, skin layer 351 (FIG. 3E), which is produced using an embodiment of the MOS deformation system, appears curvaceous and better resembles the tail of a real-life tiger.

Figure 3F:
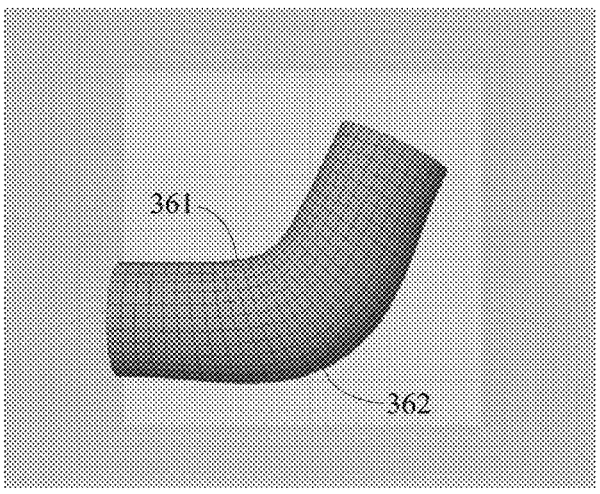

Embodiments of the MOS deformation system also allows an artist to adjust the visual appearance of a skin deformation using secondary operations, such as bulge, slide, scale, and twist operations. A secondary operation may be performed in order to produce a skin deformation that is visually convincing. For example, skeleton structure 320 (FIG. 3B) may be used to model the arm of a chubby computer generated character instead of a tiger's tail. Since the character is chubby, it may be desirable to produce exaggerated bulges in the character's skin that suggest underlying fatty tissue. FIG. 3F depicts skin 361 produced using an embodiment of the MOS deformation system, and includes bulge 362 that suggest fatty tissue. An artist looking to animate a chubby character may thus prefer skin layer 361 (produced with secondary operation) over skin layer 351 (produced without secondary operation).

It should be further noted that FIGS. 3E and 3F represent an additional feature of the MOS deformation system. Sometimes, an artist may produce multiple skin deformations (e.g., FIGS. 3D, 3E, and 3F) in order to identify the most visually convincing skin deformation for a particular character (e.g., FIG. 3F). The process of producing multiple skin deformations using a conventional deformation technique may entail multiple rounds of weight-painting that are time-consuming. As such, the repeated application of a conventional deformation technique to produce skin layers 341, 351 and 361 as shown in FIGS. 3D-3F may require significant artist time. In contrast, embodiments of the MOS deformation system allows an artist to automate portions of the weight-painting process, thereby allowing the artist to produce multiple skin deformations based on the same underlying configuration.

The ability of the MOS deformation system to produce visually convincing skin deformations and to produce multiple skin deformations through the use of weight painting strategies are discussed in additional detail, below.

3. Exemplary MOS Deformation Process

Figure 4:
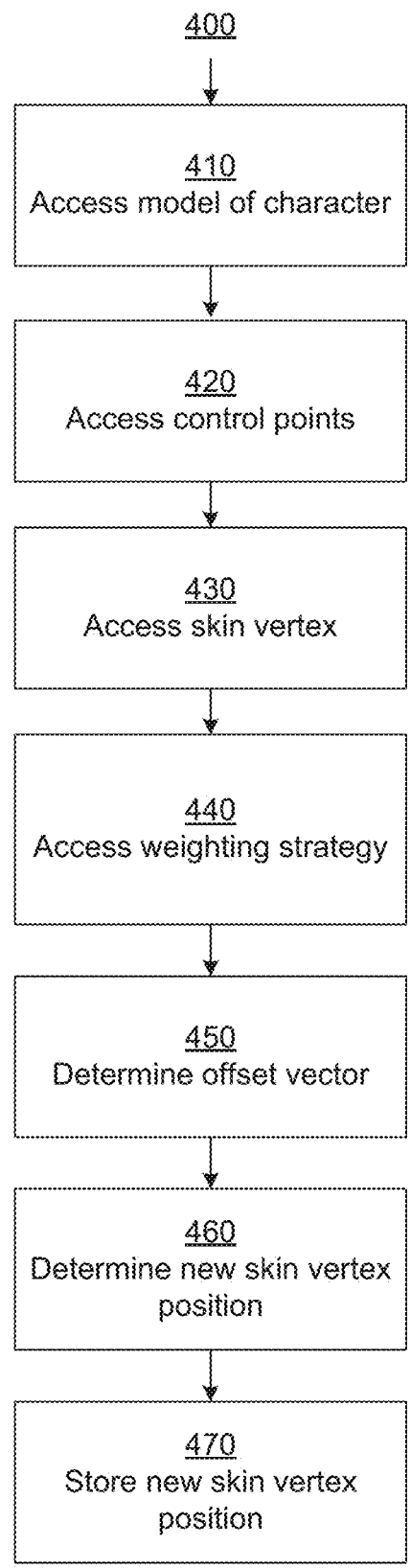
FIG. 4 is a flow chart depicting an exemplary process used in an embodiment of the MOS deformation system.

FIG. 4 depicts an exemplary process 400 for deforming the skin layer of a computer animated character using the MOS deformation system. MOS deformation process 400 may be preceded by other computer animation processes. For example, the skeleton of a computer generated character may be created in a preceding process. MOS deformation process 400 may also be followed by other computer animation processes. For example, once the skin layer of a computer generated character is deformed using MOS deformation process 400, a subsequent process may create skin-attached features on the deformed skin.

Figure 5A:
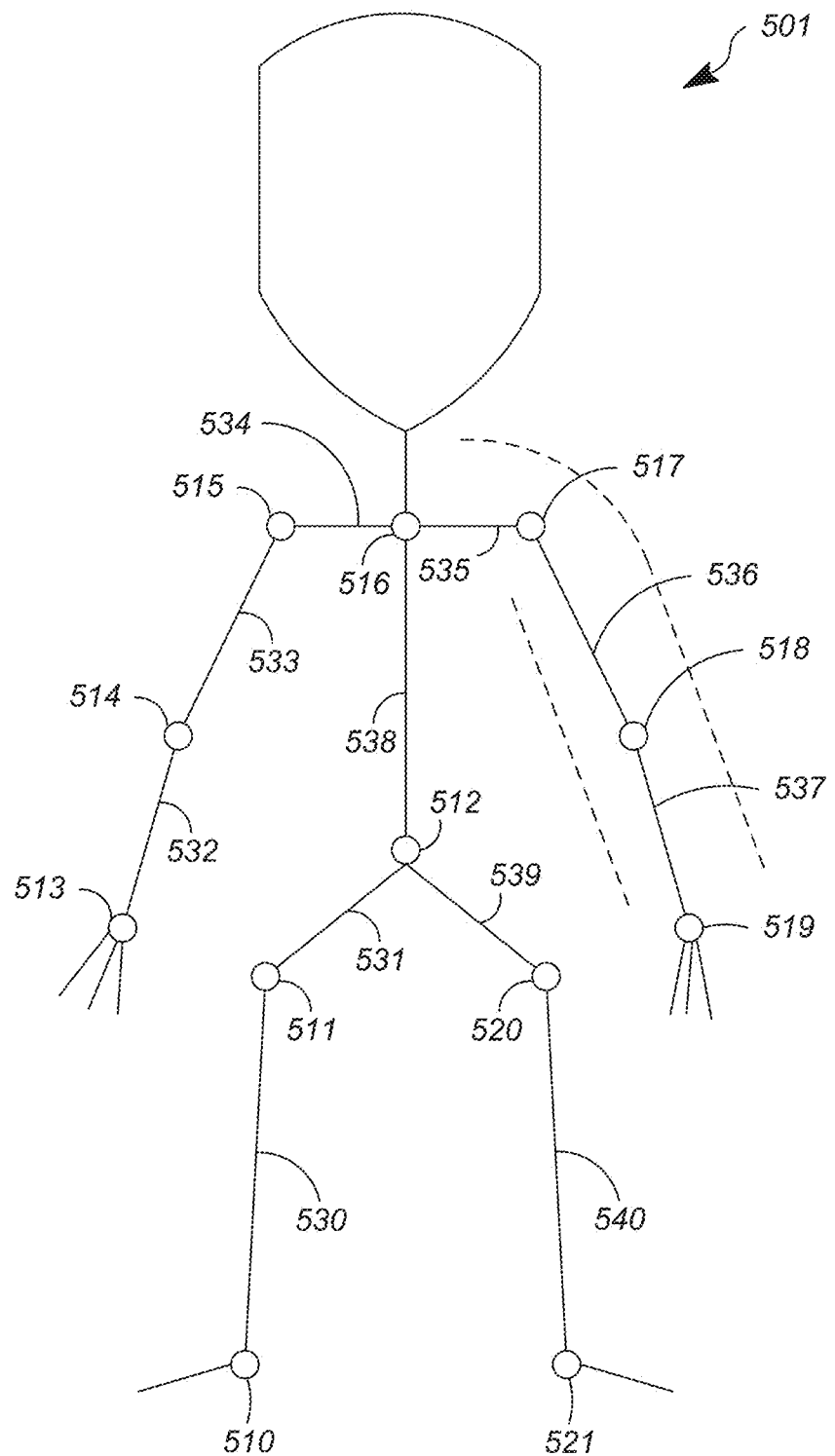
FIG. 5A is a front view depicting a computer generated character in an initial pose.

At step 410, MOS deformation process 400 accesses a skeleton structure. Generally, the skeleton structure of the model of a computer generated character includes a number of bones connected at joints. For example, FIG. 5A depicts exemplary computer generated character 501 in an initial pose. Computer generated character 501 may be modeled using a skeleton structure comprising bones 530-540 defined by joints 510-521. A bone may rotate, or move, about a joint. For example, bone 537 may rotate about joint 518. The skeleton structure may be used to describe the movement and the skin layer of computer generated character 501.

Figure 5B:
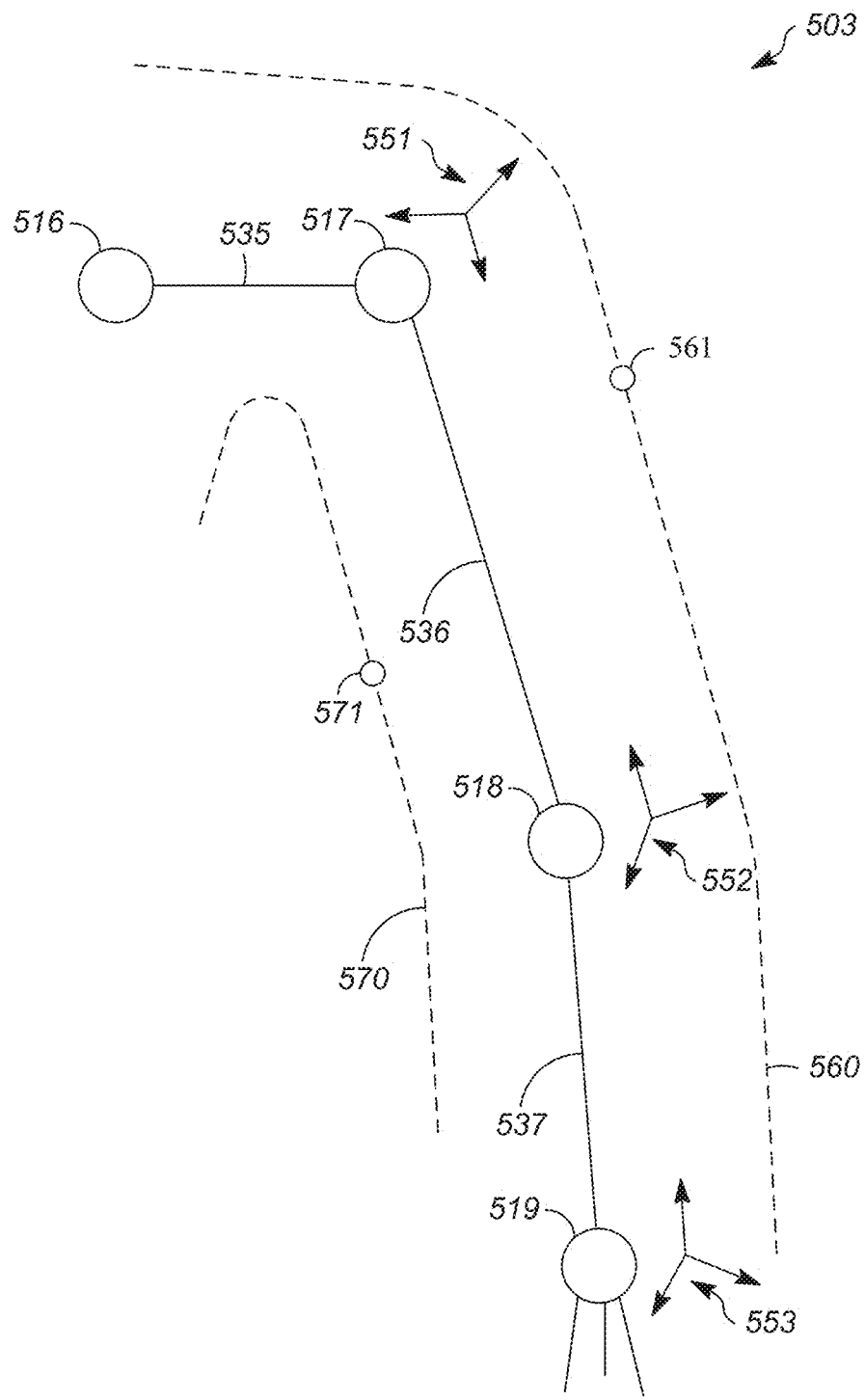
FIG. 5B is a close-up view depicting a portion of a computer generated character in the initial pose.

FIG. 5B depicts a left arm portion of computer generated character 501 in additional detail. The depicted left arm portion is represented by skeleton structure 503 which includes bones 535-537 and joints 516-519. Skin layers 560 and 570 cover the left arm portion of computer generated character 501. Each joint of a skeleton structure may be associated with a position vector and a local coordinate system. The position vector represents the position of the joint, and the local coordinate system describes the rotation of the joint about a fixed point. A local coordinate system may be described using a 3×3 matrix consisting of three vectors represented as matrix columns. Each vector indicates the rotation of a joint about one of three orthogonal directions, such as a rotation about the x-, y-, and z-axes. Skin layers 560 and 570 may be defined using skin vertices, which in turn may be defined relative to the features of skeleton structure 503. For example, skin layers 560 and 570 may be defined by skin vertices 561 and 571, which are in turn defined by the position of joints 516-519 of skeleton structure 503. A skin vertex may be a location on, adjacent to, or otherwise associated with the rendering of the skin layer of the computer generated character.

Figure 6A:
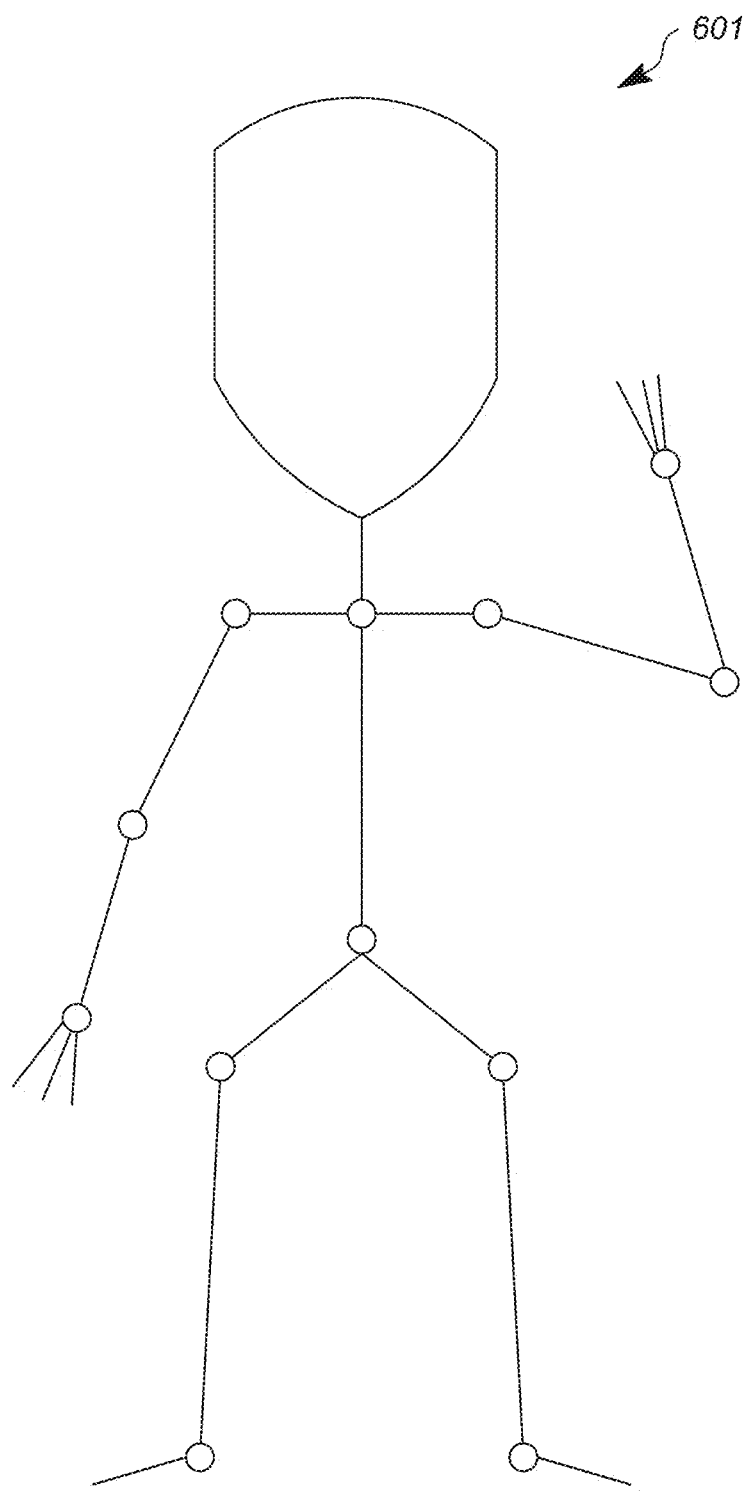
FIG. 6A is a front view depicting a computer generated character in a final pose.
Figure 6B:
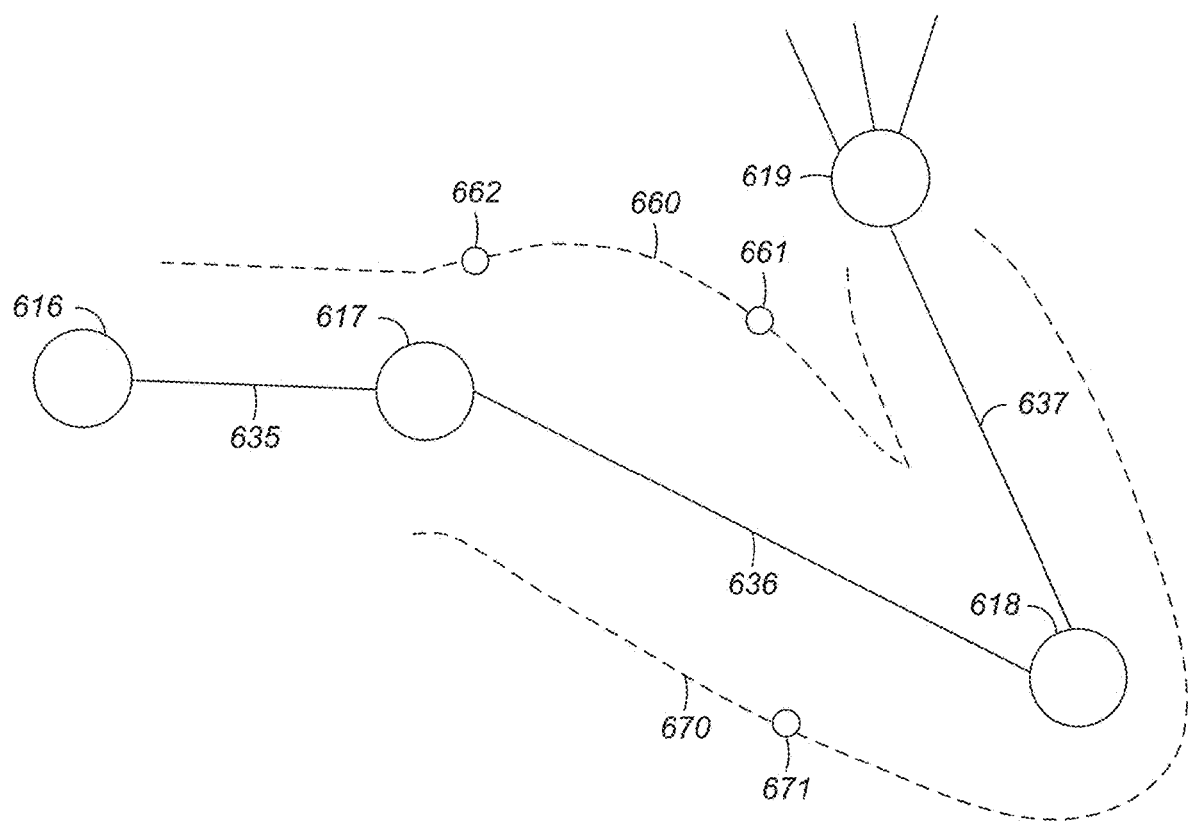
FIG. 6B is a close-up view depicting a portion of a computer generated character in the final pose.

FIG. 6A depicts computer generated character 601 in a final pose. In the final pose, the left arm portion of computer generated character 601 is raised upwards and is bent inwards. The change in the poses as illustrated by FIGS. 5A and 6A may be the result of a transformation performed by an artist through an animation system. As shown in further detail in FIG. 6B, bones 636-637 and joints 618-619 of skeleton structure 602 have rotated about joint 617 in the final pose. Bone 637 and joint 619 have also rotated about joint 618. Furthermore, skin vertices 661 and 671 have changed in position, thus, skin layers 660 and 670 each has a shape and a position that is different from skin layers 560 and 570 (FIG. 5B).

As will be described in more detail below, MOS deformation process 400 (FIG. 4) may be used to determine the new position vector of a skin vertex (e.g., skin vertex 661) in the final pose of a computer generated character. Because the skin layer of a computer generated character may be produced using multiple skin vertices, MOS deformation process 400 (FIG. 4) may be used repeatedly to determine the movements of additional skin vertices associated with the computer generated character.

Let $v_i$ represent the position vector for skin vertex "i" of a computer generated character in a final pose. MOS deformation process 400 (FIG. 4) may begin with EQ. 1 which is associated with the skeletal subspace deformation (SSD) technique discussed above.

$$v_i = \sum_{i=0}^{b} w_i T_i \hat{T}_i^{-1} \hat{v} \qquad \text{(EQ. 1)}$$

where a (b+1) number of joints may influence $v_i$, $\hat{v}$ may be a vector representing the location of the skin vertex in the initial pose, $\hat{T}_i$ may be a matrix representing the local coordinate system of the $i^{th}$ joint in the initial pose, $T_i$ may be a matrix representing the local coordinate system of the $i^{th}$ joint in the final pose, and $w_i$ may be a weight coefficient associated with the $i^{th}$ joint.

MOS deformation process 400 (FIG. 4) determines a single offset $\hat{O}$ for all joints in the initial pose. The determining of a single offset $\hat{O}$ reduces the number of matrix inversions of $\hat{T}_i$ that may have to be performed during the solution of EQ. 1. Let the offset for a single joint (e.g., the $i^{th}$ joint) in the initial pose is expressed as:

$$\hat{O}_i = \hat{T}_i^{-1} \hat{v} \qquad \text{(EQ. 2)}$$

Based on EQ. 2, the single offset for all joints in the initial pose may be expressed as:

$$\hat{O} = \left[\sum_{i=0}^{b} w_i \hat{T}_i\right]^{-1} \hat{v} \qquad \text{(EQ. 3)}$$

Thus, EQ. 1 for determining final skin vertex $v_i$ may be simplified using EQ. 3 to yield EQ. 4:

$$v_i = \sum_{i=0}^{b} w_i T_i \hat{O} \qquad \text{(EQ. 4)}$$

In contrast to EQ. 1 (i.e., SSD), EQ. 4 is more computationally efficient because the number of matrix inversions may be reduced to one (e.g., during the calculation of a single offset during EQ. 3). Using EQ. 4, the final position vector $v_i$ of skin vertex "i" may be represented as a function of weight coefficients (e.g., $w_i$), the local coordinate systems of the joints in the final pose (e.g., $T_i$), and the single offset vector (e.g., $\hat{O}$).

With reference back to FIG. 4, in one embodiment of MOS deformation process 400, $T_i$ and $\hat{T}_i$ may be obtained directly from an animation system at step 410. Further, b, $w_i$ and Ô may be determined by other steps in MOS deformation process 400 to be discussed below.

Figure 7:
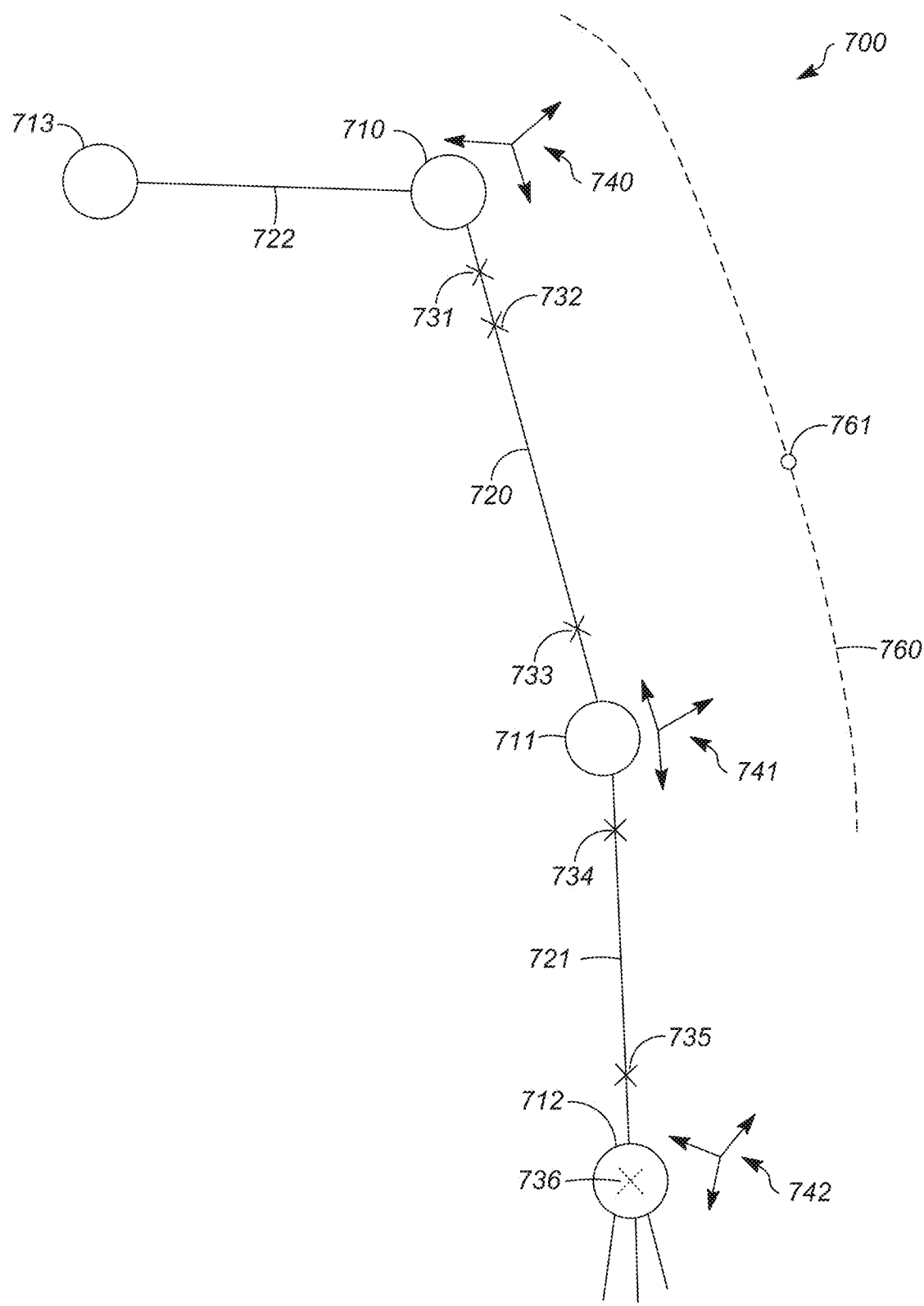
FIG. 7 is a close-up view depicting a portion of a computer generated character in an initial pose.

Turning to FIG. 7 while still referring to FIG. 4, at step 420, MOS deformation process 400 accesses an artist's identification of positions along skeleton structure 700 as MOS control points. Access to an artist's identification of MOS control points may be facilitated by a graphical user interface (GUI).

As shown in FIG. 7, skeleton structure 700 may represent an arm portion of a computer generated character, and includes joints 710-713 and bones 720-722. FIG. 7 also illustrates MOS control points 731-736, which are provided by an artist. Notably, one or more of MOS control points 731-736 may be selected to influence the positioning of skin vertex 761 in the final pose, and thereby influence the deformation of skin layer 760. A MOS control point is associated with a position vector and a local coordinate system. In one embodiment, the local coordinate system of a MOS control point may be parented to a joint, meaning that the MOS control point may use the same local coordinate system as a (parent) joint. For example, MOS control points 731-733 may be associated with local coordinate system 741, which is the local coordinate system of joint 710. Likewise, MOS control points 734-735 may be associated with local coordinate system 741, and MOS control point 736 may be associated with local coordinate system 742.

By allowing an artist to identify any position along a skeleton structure to be a MOS control point, and to associate each MOS control point with the local coordinate system of any joint of the skeleton structure, MOS deformation process 400 (FIG. 4) provides the artist with control over the joint rotation(s) that influence the deformation of a particular skin vertex. For example, although MOS control point 733 is closer in space to joint 711 than joint 710, MOS control point 733 may be associated with the local coordinate system of joint 710. If a skin vertex is later deformed based on MOS control point 733, the deformation may be more heavily influenced by the rotation of joint 710, even though joint 711 may be closer in space to the skin vertex that is being deformed.

Turning again to FIG. 7 while still referring to FIG. 4, at step 430, MOS deformation process 400 accesses an artist's identification of a skin vertex that may be deformed using the MOS control points accessed at step 420. For example, at step 430, MOS deformation process 400 may determine (e.g., access from a GUI) that skin vertex 761 (FIG. 7) is the skin vertex for which a new position is to be determined.

With reference again to FIG. 4, at step 440, MOS deformation process 400 accesses an artist's identification of a weighting strategy that may be used by downstream steps in MOS deformation process 400 in order to determine a new position vector for the skin vertex accessed at step 430 (e.g., skin vertex 761). More specifically, the weighting strategy that was used to select a subset of the MOS control points (e.g., b+1) that may be used to influence the deformation of skin vertex 761. The weighting strategy may also be used to determine the degree (e.g., $w_i$) to which each MOS control point in the subset may influence the deformation of skin vertex 761. Weighting strategies based on B-spline functions, Catmull-Clark functions, inverse distance functions, radial basis functions, and the like may be used. Access to an artist's identification of a weighting strategy may be facilitated by a GUI.

At steps 450-460, MOS deformation process 400 determines a new position vector for skin vertex 761 using the MOS control points accessed at step 420, the skin vertex accessed at step 430, and the weighting strategy accessed at step 440. The new skin vertex position vector may be stored at step 470. Because the techniques performed in steps 450-470 may vary depending on the weighting strategy accessed at step 440, steps 450-470 are discussed below with respect to exemplary weighting strategies.

4. Example: B-Spline Weighting Strategy

The example provided immediately below describes the use of a cubic B-spline weighting strategy during steps 450-470 in response to the cubic B-spline weighting strategy being accessed at step 440 of MOS deformation process 400. It should be noted that step 440 may access a weighting strategy other than the cubic B-spline weighting strategy. Other examples of weighting strategies are also discussed below.

At step 450, the cubic B-spline weighting strategy accessed at step 440 and MOS control points accessed at step 420 may be used to determine b, $w_i$ and Ô, which are necessary to determine the new position vector of skin vertex 761 (FIG. 7) using EQ. 4.

Figure 8:
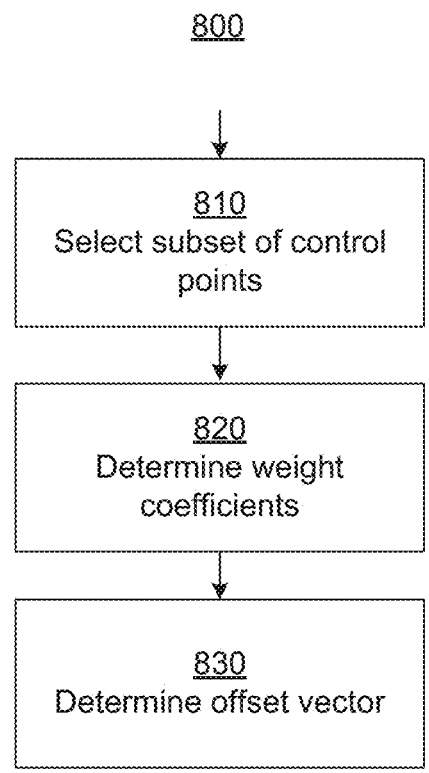
FIG. 8 is a flow chart depicting another exemplary process used in an embodiment of the MOS deformation system.

FIG. 8 illustrates an exemplary process 800 used in one embodiment for carrying out step 450 of MOS deformation process 400. At step 810, process 800 may select a subset of MOS control points (accessed during step 420 of process 400) for influencing the deformation of a skin vertex (e.g., skin vertex 761 in FIG. 7). A group of four MOS control points may be selected by process 800 during step 810, meaning b=3. The four selected MOS control points may be used as B-spline control points to construct a B-spline limit curve in 2-D or 3-D space.

Since MOS deformation process 400 may have accessed more than a total of four MOS control points at step 420 (FIG. 4), step 810 may choose a subset of the MOS control points for use as B-spline control points. For example, if six MOS control points exist, there may be three ways of selecting a subset of four MOS control points for use as B-spline control points while maintaining the sequence of the six MOS control points. At step 810, process 800 may construct a B-spline limit curve for each of the three subsets of four MOS control points. Of the three limit curves, one limit curve will include a point that is most adjacent to the skin vertex that is to be deformed. For simplicity, the point closet to the skin vertex may be referred to as the bind point, and limit curve that includes the bind point may be referred to as the bind curve. The subset of four MOS control points which, when used as B-spline control points, yields the bind curve is selected by step 810.

At step 820, process 800 determines a set of four weight coefficients (e.g., $w_i$) using the bind curve. Given the bind point, and the four MOS control points that define the bind curve, B-spline basis functions may be used to determine four coefficients associated with the four MOS control points. Uniform Non-rational B-Spline functions such as those described in James D. Foley et al., Computer Graphics: Principles and Practice in C § 11.2.3 (2d ed. 1997), may be used. Once determined, the four weight coefficients (e.g., $w_i$ where $0 \leq i \leq (b=3)$) are used by downstream steps of process 800 discussed below.

At step 830, process 800 determines a single local coordinate vector, referred to as a MOS single offset vector, using the subset of MOS control points and weight coefficients determined at steps 810-820. For sake of clarity, the set of weight coefficients determined at step 820 are referred to as τ, the skin vertex that is to be deformed (e.g., skin vertex 761 in FIG. 7) are referred to as $m_i$, and the MOS offset vector that is to be determined is referred to as $O_i$.

A B-spline curve produced from four B-spline control points that are each offset by MOS single offset vector $O_i$ may be represented as:

$$v_i = \sum_{j=0}^{n=3} (p_{ij} + F_{ij}O_i)w_{ij} \quad (EQ. 5)$$

where $p_{ij}$ is a vertex representing the location of the $j^{th}$ MOS control point, $F_{ij}$ is the local coordinate system of the $i^{th}$ MOS control point (e.g., a 3×3 matrix) and $w_{ij}$ is the weight coefficient of the $j^{th}$ MOS control point.

A B-spline curve produced by $O_i$ that passes through skin vertex $m_i$ at the same B-spline curve parameter T may be represented as:

$$v_i = m_i \quad (EQ. 6)$$

Single offset vector $O_i$ is determined by combining EQ. 5 and EQ. 6:

$$\sum_{j=0}^{n=3} (p_{ij} + F_{ij}O_i)w_{ij} = m_i \quad (EQ. 7)$$

$$m_i - \sum_{j=0}^{n=3} p_{ij}w_{ij} = \sum_{j=0}^{n=3} F_{ij}O_iw_{ij} \quad (EQ. 8)$$

$$O_i = \left[\sum_{j=0}^{n=3} F_{ij}w_{ij}\right]^{-1} \left[m_i - \sum_{j=0}^{n=3} p_{ij}w_{ij}\right] \quad (EQ. 9)$$

One skilled in the art would appreciate that $O_i$, as shown in EQ. 9, has a closed-form solution. By constructing a closed-form solution for $O_i$, it is unnecessary (although possible) to solve for $O_i$ using an iterative process. The iterative solution of $O_i$ is generally more computationally intensive than the calculation of a closed form solution for the same $O_i$.

Turning back to FIG. 4, once a single offset vector $O_i$ is determined using exemplary process 800 and EQ. 9 discussed immediately above, the single offset vector $O_i$ is used at step 460 of MOS deformation process 400 to deform a skin vertex, meaning that a new position vector for the skin vertex is determined. The new position vector (e.g., $v_i$) for the skin vertex is determined by solving EQ. 5 discussed above:

$$v_i = \sum_{j=0}^{n=3} (p_{ij} + F_{ij}O_i)w_{ij} \quad (EQ. 5)$$

where n is the total number of MOS control points selected for use at step 450, $O_i$ is the single offset vector determined at step 450 (EQ. 9) and $w_{ij}$ is the weight coefficient of the $j^{th}$ MOS control point determined at step 450. Also, $p_{ij}$ is a vertex representing the location of the $j^{th}$ MOS control point that may be obtained from the animation system, $F_{ij}$ is the local coordinate system of the $j^{th}$ MOS control point that may also be obtained from the animation system. Note, the subscript "i" may be used to identify a particular skin vertex. For example, the subscript "i" may denote a skin vertex as the $i^{th}$ skin vertex defining particular skin layer.

FIGS. 7 and 9 illustrate the movement of a skin vertex from one pose to another pose and the corresponding skin deformation. FIG. 7 illustrates skin vertex 761 at an initial pose. FIG. 9 shows skin vertex 961, which corresponds to skin vertex 761 at a final pose. That is, skin vertex 761 is represented by position vector $m_i$ (in FIG. 7) to and skin vertex 961 is represented by position vector $v_i$ (in FIG. 9). At step 470, the new skin vertex position vector (e.g., $v_i$) may be stored into memory for use by other animation processes. MOS deformation process 400 may be repeated to deform multiple skin vertices so that a skin layer, such as skin layers 960 and 970, may be rendered using the multiple skin vertices that have been deformed.

5. Example: Catmull Clark Weighting Strategy

In addition to the B-spline functions discussed immediately above, steps 450-460 of MOS deformation process 400 may use other weighting strategies to determine the new position vector of a skin vertex. For instance, at step 450, MOS deformation process 400 may use Catmull-Clark basis functions to identify a number (i.e., b+1) of MOS control points. More specifically, Catmull-Clark basis functions such as those described in Edwin Catmull and Jim Clark, Recursively generated B-spline surfaces on arbitrary topological and meshes, Computer-Aided Design 10, 350-355 (September 1978), may be used to identify a number of MOS control points and a single offset vector ($\hat{O}$). At step 460, the identified MOS control points and single offset vector ($\hat{O}$) may be used with EQ. 4 to determine the new position vector ($v_i$) of a skin vertex. At step 470, the new skin vertex position vector ($v_i$) may be stored into memory for use by other animation processes.

6. Example: Inverse Distance Weighting Strategy

The example provided immediately below describes the use of an inverse distance weighting strategy during steps 450-470 of MOS deformation process 400. At step 450, the inverse distance weighting strategy and MOS control points accessed at step 420 may be used to determine $w_i$ and $\hat{O}$, which are necessary to determine a new position vector for skin vertex 761 (FIG. 7).

The inverse distance weighting strategy may select any number (e.g, b+1) of MOS control points. A coefficient (e.g., $w_i$) that is inversely proportional to the distance between the $i^{th}$ MOS control point and the skin vertex that is to be deformed is assigned to one or more of the selected MOS control points. The coefficients ($w_i$) may be normalized such that they sum up to one.

A single offset vector $O_i$ may be calculated using the group of MOS control points (e.g, b) and weight coefficients ($w_i$) identified above:

$$O_i = \left[\sum_{j=0}^{b} w_{ij}F_{ij}\right]^{-1} m_i \quad (EQ. 10)$$

where (b+1) is the number of MOS control points with non-zero coefficient values, $w_{ij}$ is the weight coefficient of the $j^{th}$ MOS control point, $F_{ij}$ is the local coordinate system of the $i^{th}$ MOS control point, and $m_i$ is a vertex representing the current position vector of the skin vertex to be deformed.

Once a single offset vector $O_i$ is determined (using EQ. 10), the single offset vector $O_i$ is used at step 460 of MOS deformation process 400 to deform a skin vertex, meaning that a new location for the skin vertex may be determined. The new location (e.g., $v_i$) for the skin vertex is determined by using EQ. 4. At step 470, the new skin vertex position vector (e.g., $v_i$) may be stored into memory for use by other animation processes.

7. Secondary Operations: Bulge, Slide, Twist, Scale

Based on the foregoing, MOS deformation process 400 (FIG. 4) may generally use as input, among others, the local coordinate systems (e.g., $F_{ij}$) and the position vectors (e.g., $p_{ij}$) of MOS control points. Thus, a change in the value of the local coordinate system and/or the position vector of a MOS control point would influence the outcome of a skin deformation performed by MOS deformation process 400. That is, the outcome of a MOS deformation may be modified by changing the values of $F_{ij}$ and/or $p_{ij}$ prior to deformation using MOS deformation process 400. In some embodiments, MOS deformation process 400 is configured to access changes to values $F_{ij}$ and/or $p_{ij}$ via an artist's input. Notably, modifications to the values $F_{ij}$ and/or $p_{ij}$ may produce skin deformations that have the visual effect of bulging, sliding, scaling, and/or twisting.

Figure 10A:
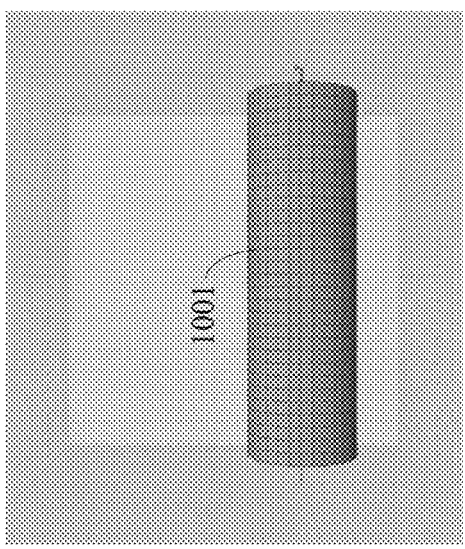
FIGS. 10A-E are screen views depicting skin deformations produced using an embodiment of the MOS deformation system.
Figure 10B:
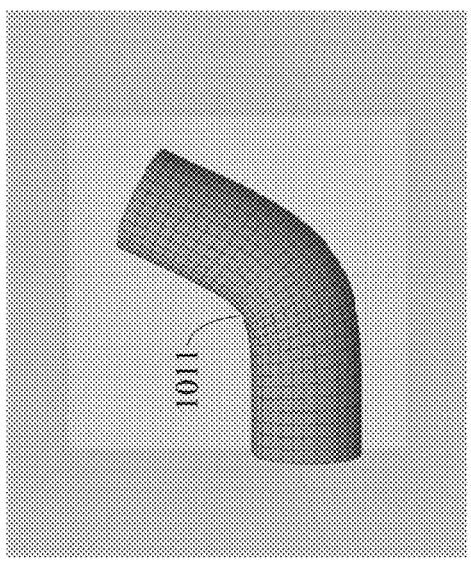
Figure 10C:
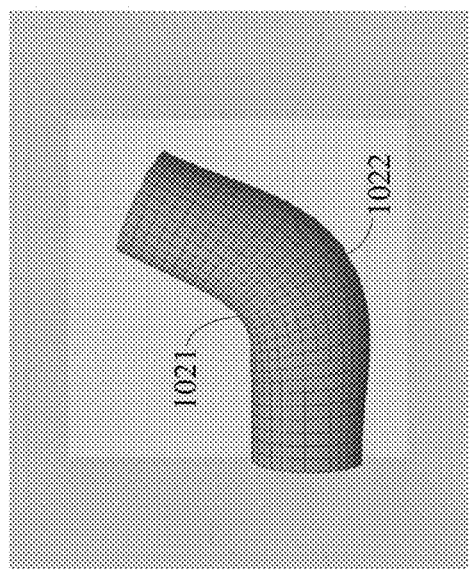

FIGS. 10A-B depict skin 1001 in an initial pose and skin 1011 in a final pose respectively, and may be produced using MOS deformation process 400. FIG. 10C depicts skin 1021 with a bulge that may be produced using MOS deformation process 400. As discussed above, step 450 of MOS deformation process 400 may select MOS control points for use during the deformation process. A bulge in a skin deformation may be produced by modifying the position vector (e.g., $p_{ij}$) of one or more of the selected MOS control points. Specifically, the position vector of one or more of the selected MOS control points may be scaled by a percentage factor. The use of scaled position vectors in EQS. 5 and 9 results in skin deformation that includes a visual effect resembling bulge 1022 (FIG. 10C). The scaling factor for each selected MOS control point may be adjusted individually to achieve a desired bulging effect.

Figure 10D:
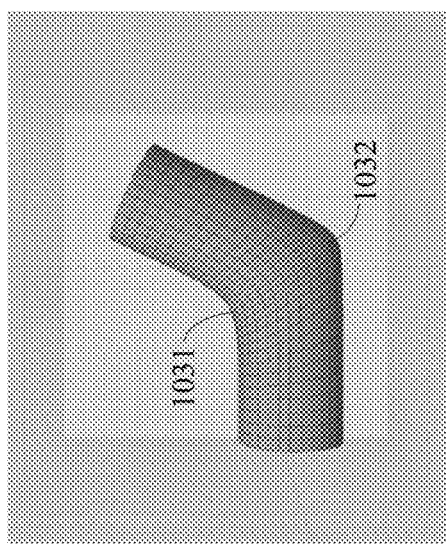

FIG. 10D depicts skin 1031 that is produced using MOS deformation process 400 with a slide operation. To perform a slide operation, the position vector of one or more of the MOS control points selected at step 450 of MOS deformation process 400 may be modified. The position vector of a selected MOS control point may be offset by the local frame of the selected MOS control point. Further, the position vector of the selected MOS control point may be adjusted to point in a direction parallel to the axis of an adjacent bone. The use of one or more adjusted position vectors in EQS. 5 and 9 may result in skin deformation that includes a visual effect resembling slide 1032 (FIG. 10D). The direction of position vectors may be further adjusted individually in order to produce a desired sliding effect.

Figure 10E:
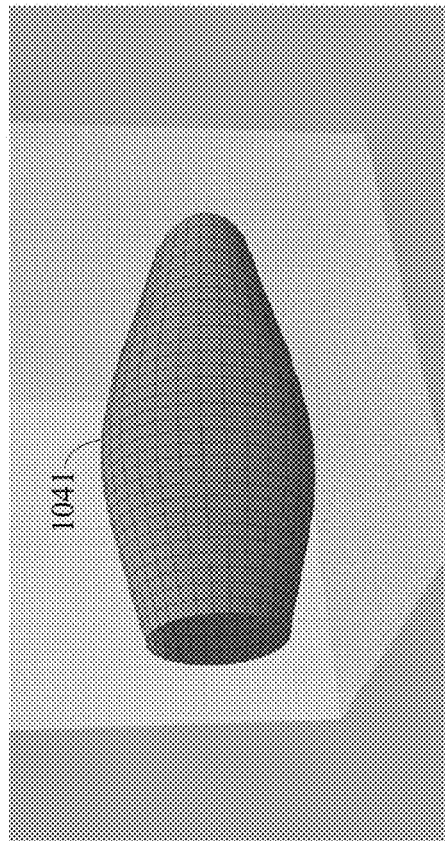

FIG. 10E depicts skin 1041 in a final pose and is produced using MOS deformation process 400 (FIG. 4) with a scale operation. MOS deformation process 400 (FIG. 4) may adjust the movement in the position of a skin vertex between an initial position and a final pose. Specifically, a scaling factor may be used to increase or decrease the change in position of multiple skin vertices. As shown in FIG. 10E, the middle joint of cylinder 1041 is scaled by a factor of 2 in the Y-axis and in the Z-axis.

Figure 11A:
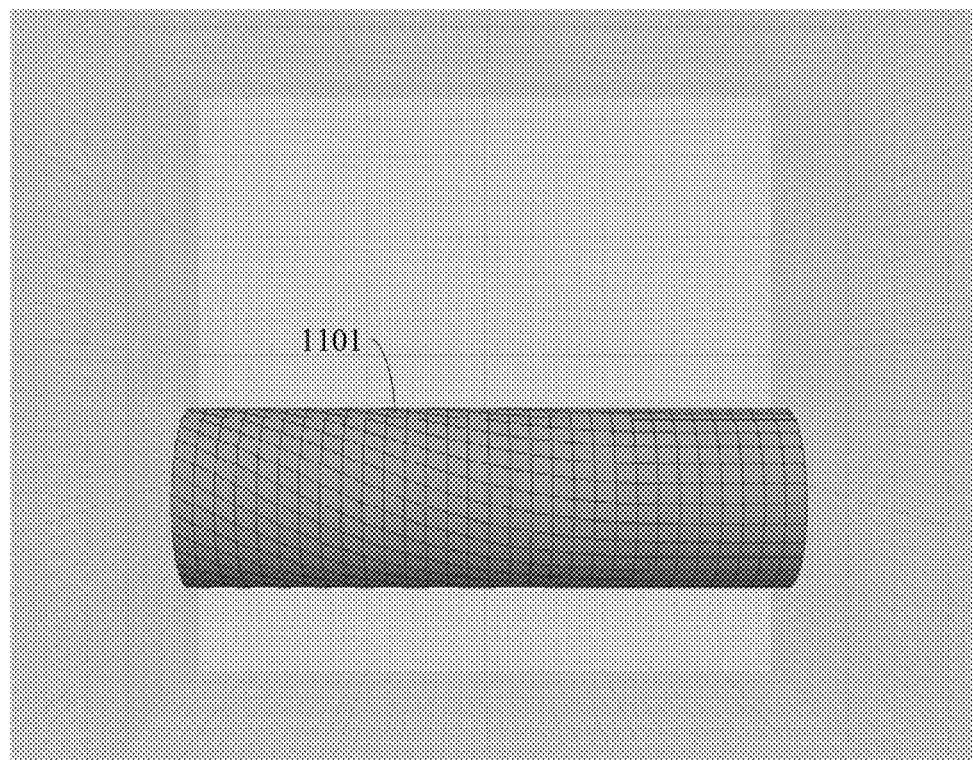
FIGS. 11A-B are screen views depicting skin deformations produced using an embodiment of the MOS deformation system.
Figure 11B:
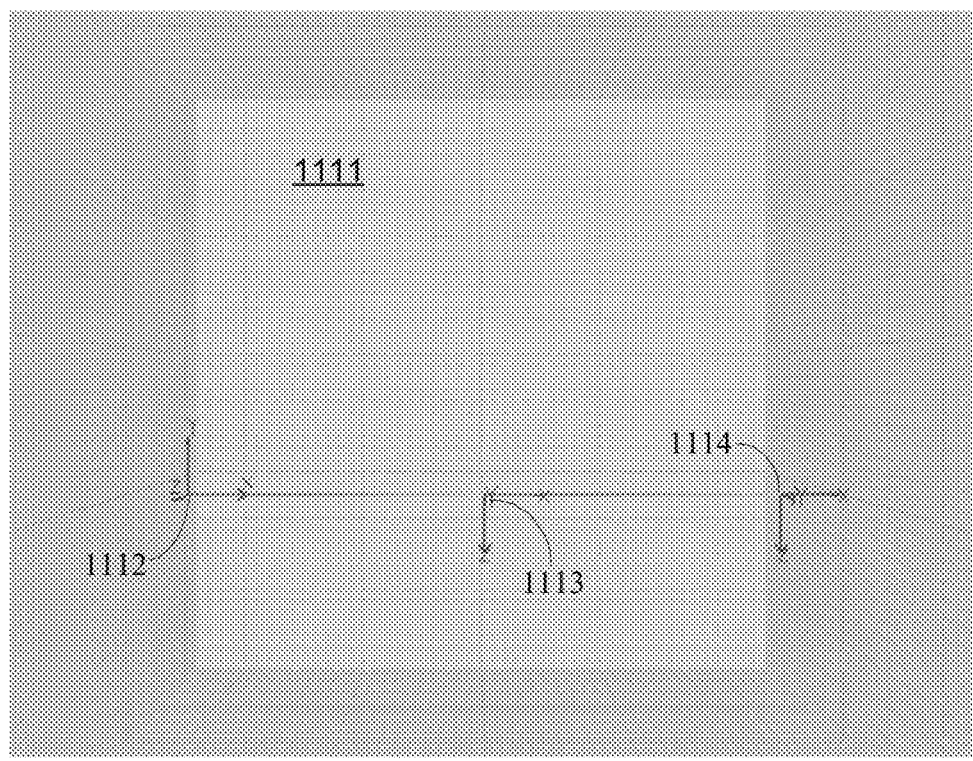

FIG. 11A depicts skin 1101 in a final pose and may be produced using MOS deformation process 400 with a twist operation. FIG. 11B depicts skeleton structure 1111, which includes three MOS control points. Local coordinate systems 1112, 1113, and 1114 are associated with the three MOS control points. MOS deformation process 400 (FIG. 4) may decompose each local coordinate system (e.g., 1112-1114) into a twist frame and an orientation frame. For each MOS control point, MOS deformation process 400 (FIG. 4) may compute a change in twist and a change in orientation between the joint in the initial pose and the joint in the final pose. The amount of twist between the initial and final poses of a MOS control point may be adjusted. A single offset vector relative to the twist axis is determined by blending the twist frames of the MOS control points. Further, a single offset vector relative to the twist axis is determined. The use of the single offset vector in EQ. 9 results in a skin deformation that includes a visual effect resembling twist as shown in FIG. 11B.

Figure 12:
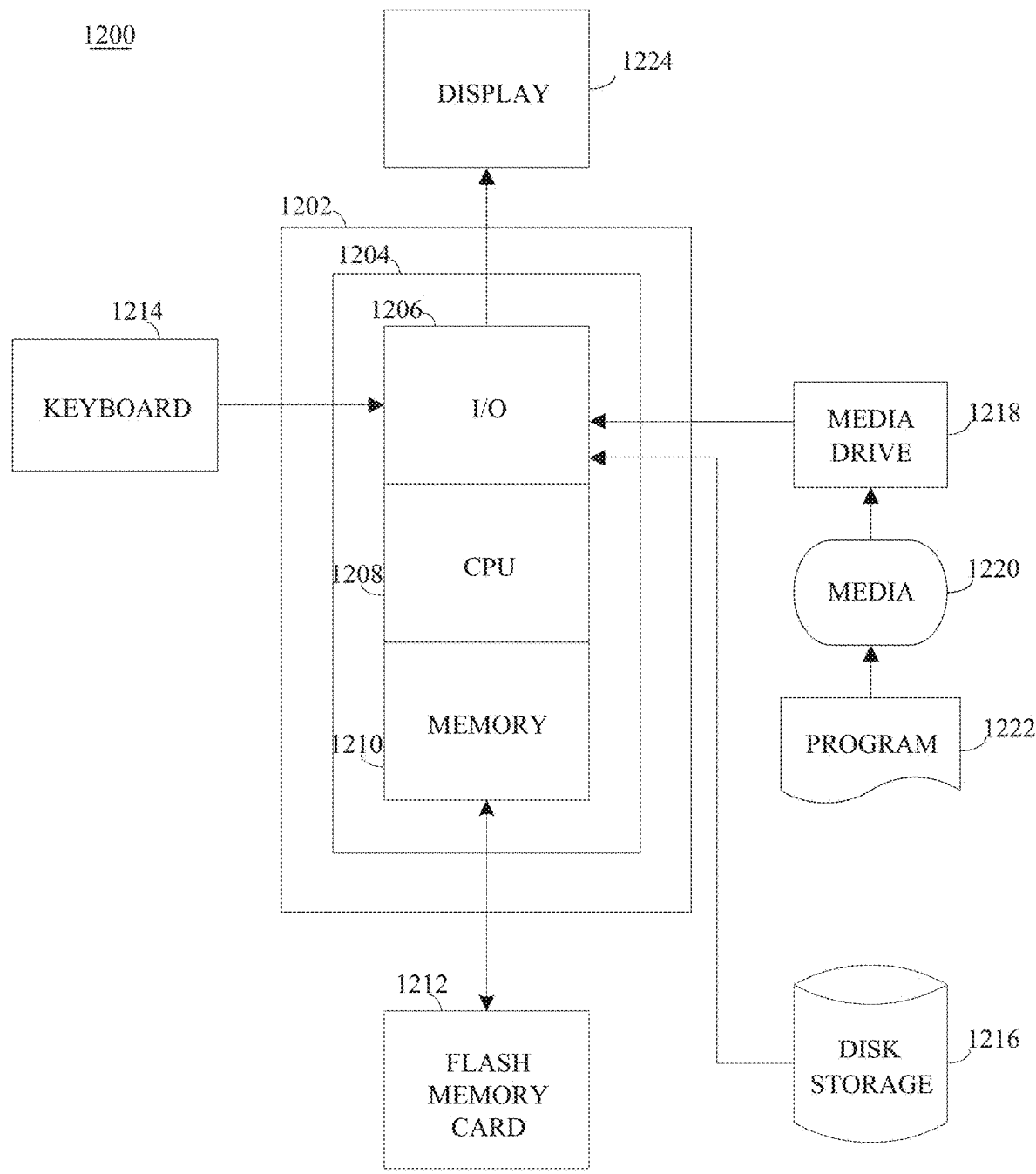
FIG. 12 is a block diagram depicting an exemplary deformation system.

FIG. 12 depicts computing system 1200 with a number of components that may be used to perform the above-described processes. The main system 1202 includes a motherboard 1204 having an I/O section 1206, one or more central processing units (CPU) 1208, and a memory section 1210, which may have a flash memory card 1212 related to it. The I/O section 1206 is connected to a display 1224, a keyboard 1214, a disk storage unit 1216, and a media drive unit 1218. The media drive unit 1218 can read/write a computer-readable medium 1220, which can contain programs 1222 and/or data.

At least some values based on the results of the above-described processes can be saved for subsequent use. Additionally, a computer-readable medium can be used to store (e.g., tangibly embody) one or more computer programs for performing any one of the above-described processes by means of a computer. The computer program may be written, for example, in a general-purpose programming language (e.g., Pascal, C, C++, Java) or some specialized application-specific language.

Although only certain exemplary embodiments have been described in detail above, those skilled in the art will readily appreciate that many modifications are possible in the exemplary embodiments without materially departing from the novel teachings and advantages of this disclosure. For example, aspects of embodiments disclosed above can be combined in other combinations to form additional embodiments. Accordingly, all such modifications are intended to be included within the scope of this technology.

What is claimed is:

1. A computer-implemented method for deforming a skin of a model of a computer animation character, the method comprising:

accessing the model, wherein the model includes a skeleton having a plurality of bones connected at one or more joints;

accessing a user's selection of control points;

accessing a skin vertex, wherein the skin vertex represents a location on the skin and the skin vertex is associated with a position vector;

receiving a user input representing selection of a geometric function;

subsequent to accessing the user's selection of the control points and receiving the user input representing selection of the geometric function, using, by one or more processors, the selected geometric function to:

perform an automated control point selection process that selects one of a first smaller subset of control points and a second smaller subset of control points from the user's selection of the control points, wherein the first smaller subset is different from the second smaller subset, wherein—the automated control point selection process is performed by the one or more processors, and wherein the automated control point selection process comprises:

determining, using the selected geometric function and at least a portion of the user's selection of the one or more control points, one or more geometric objects;

performing a first calculation using the selected geometric function and the first smaller subset of control points;

performing a second calculation using the selected geometric function and the second smaller subset of control points; and selecting one of the first smaller subset and the second smaller subset of control points using the determined one or more geometric objects and results of the first and second calculations, the results being indicative of a proximity of the first and second subsets of control points to the skin vertex; and determine an influence of each control point in the selected smaller subset has over a new position vector of the skin vertex;

determining the new position vector of the skin vertex using the selected smaller subset of control points and corresponding influence; and storing the new position vector of the skin vertex, wherein a portion of the skin of the computer animation character is displayed, during animation, at the new position vector of the skin vertex.

2. The computer-implemented method of claim 1, further comprising:

determining a numerical coefficient for each control point in the selected smaller subset of control points using the position vector of the skin vertex, a position vector of each control point in the selected smaller subset of control points, and the selected geometric function, wherein the numerical coefficient for a given control point represents the influence of the given control point over the new position vector of the skin vertex; and determining an offset vector associated with each control point in the selected smaller subset of control points and the numerical coefficients.

3. The computer-implemented method of claim 1, wherein:

the geometric function is a B-spline geometric function, a Catmull-Clark geometric function, or an inverse distance weighting function.

4. The computer-implemented method of claim 1, wherein determining the one or more geometric objects using the selected geometric function and at least a portion of the one or more control points comprises:

determining a plurality of limit curves using the one or more control points, wherein each limit curve of the plurality of limit curves is based on different control points of the one or more control points.

5. The computer-implemented method of claim 1, further comprising:

calculating a difference between the position vector of the skin vertex and the new position vector of the skin vertex;

receiving a user's selection of a scaling factor; and determining another position vector for the skin vertex based on the received scaling factor, the calculated difference, and at least one of the position vector of the skin vertex and the new position vector of the skin vertex.

6. The computer-implemented method of claim 1; wherein the one or more geometric objects include one or more of a geometric curve or a geometric surface.

7. A non-transitory computer-readable storage medium having computer-executable instructions for deforming a skin of a model of a computer animation character, comprising instructions for:

accessing the model, wherein the model includes a skeleton having a plurality of bones connected at one or more joints;

accessing a user's selection of one or more control points;

accessing a skin vertex, wherein the skin vertex represents a location on the skin and the skin vertex is associated with a position vector;

receiving user input representing selection of a geometric function;

subsequent to accessing the user's selection of the one or more control points and receiving the user input representing selection of the geometric function, using the selected geometric function to:

perform an automated control point selection process that selects one of a first smaller subset of control points and a second smaller subset of control points from the user's selection of the one or more control points, wherein the first smaller subset is different from the second smaller subset, wherein the automated control point selection process is performed by one or more processors, and wherein the automated control point selection process comprises:

determining, using the selected geometric function and at least a portion of the user's selection of the one or more control points; one or more geometric objects;

performing a first calculation using the selected geometric function and the first smaller subset of control points;

performing a second calculation using the selected geometric function and the second smaller subset of control points; and selecting one of the first smaller subset and the second smaller subset of control points using the determined one or more geometric objects and results of the first and second calculations, the results being indicative of a proximity of the first and second subsets of control points to the skin vertex; and determine an influence; of each control point of the selected smaller subset, over a new position vector of the skin vertex;

determining the new position vector of the skin vertex using the selected smaller subset of control points and corresponding influence; and storing the new position vector of the skin vertex, wherein a portion of the skin of the computer animation character is displayed, during animation; at the new position vector of the skin vertex.

8. The non-transitory computer-readable storage medium of claim 7, the computer-executable instructions further comprising instructions for:

determining a numerical coefficient for each control point in the selected smaller subset of control points using the position vector of the skin vertex, a position vector of each control point in the selected smaller subset of control points, and the selected geometric function, wherein the numerical coefficient for a given control point represents the influence of the given control point over the new position vector of the skin vertex; and determining an offset vector associated with each control point in the selected smaller subset of control points and the numerical coefficients.

9. The non-transitory computer-readable storage medium of claim 7, wherein:
the geometric function is a B-spline geometric function, a Catmull-Clark geometric function, or an inverse distance weighting function.

10. The non-transitory computer-readable storage medium of claim 7, wherein determining the one or more geometric objects using the selected geometric function and at least a portion of the one or more control points comprises:
determining a plurality of limit curves using the one or more control points, wherein a first limit curve of the plurality of limit curves is based on the first smaller subset of control points and the second limit curve is based on the second smaller subset of control points.

11. The non-transitory computer-readable storage medium of claim 7, the computer-executable instructions further comprising instructions for:
calculating a difference between the position vector of the skin vertex and the new position vector of the skin vertex;
receiving a user's selection of a scaling factor; and
determining another position vector for the skin vertex based on the received scaling factor, the calculated difference, and at least one of the position vector of the skin vertex and the new position vector of the skin vertex.

12. The non-transitory computer-readable storage medium of claim 7, wherein the one or more geometric objects include one or more of a geometric curve or a geometric surface.

13. A system for deforming a skin of a model of a computer animation character, the system comprising:
a memory operatively coupled to one or more processors, wherein the memory comprises one or more programs, which, when executed by the one or more processors, cause the processors to:
access the model, wherein the model includes a skeleton having a plurality of bones connected at one or more joints,
access a user's selection of one or more control points;
access a skin vertex, wherein the skin vertex represents a location on the skin and the skin vertex is associated with a position vector;
receive user input representing selection of a geometric function;
subsequent to accessing the user's selection of the control points and receiving the user input representing selection of the geometric function, use the selected geometric function to:
perform an automated control point selection process that selects one of a first smaller subset of control points and a second smaller subset of control points from the user's selection of the control points, wherein the first smaller subset is different from the second smaller subset, wherein the automated control point selection process is performed by one or more processors, and wherein the automated control point selection process comprises:
determining, using the selected geometric function and at least a portion of the user's selection of the one or more control points, one or more geometric objects; and
performing a first calculation using the selected geometric function and the first smaller subset of control points;
performing a second calculation using the selected geometric function and the second smaller subset of control points; and
selecting one of the first smaller subset and the second smaller subset of control points using the determined one or more geometric objects and results of the first and second calculations, the results being indicative of a proximity of the first and second subsets of control points to the location represented by the skin vertex; and
determine an influence, of each control point of the selected smaller subset, over a new position vector of the skin vertex;
determine the new position vector of the skin vertex using the selected smaller subset of control points and corresponding influence; and
store the new position vector of the skin vertex, wherein a portion of the skin of the computer animation character is displayed, during animation, at the new position vector of the skin vertex.

14. The system of claim 13, wherein the one or more programs further comprise instructions for:
determine a numerical coefficient for each control point in the selected smaller subset of control points using the position vector of the skin vertex, a position vector of each control point in the selected smaller subset of control points, and the selected geometric function, wherein the numerical coefficient for a given control point represents the influence of the given control point over the new position vector of the skin vertex; and
determine an offset vector using the local coordinate system associated with each control point in the selected smaller subset of control points and the numerical coefficients.

15. The system of claim 13, wherein:
the geometric function is a B-spline geometric function, a Catmull-Clark geometric function, or an inverse distance weighting function.

16. The system of claim 13, wherein determining the one or more geometric objects using the selected geometric function and at least a portion of the one or more control points comprises:
determining a plurality of limit curves using the one or more control points, wherein each limit curve of the plurality of limit curves is based on different control points of the one or more control points.

17. The system of claim 13, wherein the one or more programs further comprise instructions for:
calculating a difference between the position vector of the skin vertex and the new position vector of the skin vertex;
receiving a user's selection of a scaling factor; and
determining another position vector for the skin vertex based on the received scaling factor, the calculated difference, and at least one of the position vector of the skin vertex and the new position vector of the skin vertex.

18. The system of claim 13, wherein the one or more geometric objects include one or more of a geometric curve or a geometric surface.

* * * * *

UNITED STATES PATENT AND TRADEMARK OFFICE
CERTIFICATE OF CORRECTION

PATENT NO. : 10,559,109 B2  
APPLICATION NO. : 15/723063  
DATED : February 11, 2020  
INVENTOR(S) : Paul Carmen DiLorenzo et al.

Page 1 of 1

It is certified that error appears in the above-identified patent and that said Letters Patent is hereby corrected as shown below:

On the Title Page

Column 1, item (73), Line 2, delete "Universale" and insert -- Universal --, therefor.

In the Claims

In Claim 6, at Column 13, Line 65, delete "claim 1;" and insert -- claim 1, --, therefor.

In Claim 7, at Column 14, Line 46, delete "influence;" and insert -- influence, --, therefor.

In Claim 7, at Column 14, Line 54, delete "animation;" and insert -- animation, --, therefor.

In Claim 13, at Column 15, Line 43, delete "joints," and insert -- joints; --, therefor.

Signed and Sealed this  
Nineteenth Day of January, 2021

Andrei Iancu  
*Director of the United States Patent and Trademark Office*